United States Patent [19]

Wheatley

[11] Patent Number: 5,348,709

[45] Date of Patent: Sep. 20, 1994

[54] APPARATUS FOR GENERATING OZONE

[75] Inventor: James Wheatley, Glasgow, Scotland

[73] Assignee: Triogen Limited, Scotland, United Kingdom

[21] Appl. No.: 66,073

[22] PCT Filed: Oct. 31, 1991

[86] PCT No.: PCT/GB91/01911

§ 371 Date: May 26, 1993

§ 102(e) Date: May 26, 1993

[87] PCT Pub. No.: WO92/09524

PCT Pub. Date: Jun. 11, 1992

[30] Foreign Application Priority Data

Dec. 1, 1990 [GB] United Kingdom ............... 9026180.1

[51] Int. Cl.$^5$ .............................................. B01J 19/12
[52] U.S. Cl. ..................... 422/186.18; 422/186.07
[58] Field of Search ...................... 422/186.07, 186.18

[56] References Cited

U.S. PATENT DOCUMENTS

| | | | |
|---|---|---|---|
| 1,041,340 | 10/1912 | Peek, Jr. ................. | 422/186.18 |
| 1,050,260 | 1/1913 | Walopn ................... | 422/186.19 |
| 1,358,443 | 11/1920 | Hezd ...................... | 422/186.18 |
| 1,437,760 | 12/1922 | Kuhlpnschmidt ........ | 422/186.18 |
| 1,454,219 | 5/1923 | Goedicke ................. | 422/186.18 |
| 1,577,747 | 3/1926 | Hartman .................. | 422/186.18 |
| 1,579,162 | 3/1926 | Starke et al. ............. | 422/186.18 |
| 1,834,705 | 12/1931 | Hartman .................. | 422/186.18 |
| 3,364,129 | 1/1968 | Cremer et al. ............ | 204/321 |
| 4,011,165 | 3/1977 | Filippov et al. ........... | 250/540 |
| 4,774,062 | 9/1988 | Apinpmann ............. | 422/186.18 |
| 4,886,645 | 12/1989 | Fischer et al. ............ | 422/186.18 |
| 5,008,087 | 4/1991 | Batchelor ................. | 422/186.22 |

FOREIGN PATENT DOCUMENTS

| | | |
|---|---|---|
| 479484 | 7/1929 | Fed. Rep. of Germany . |
| 1034509 | 6/1966 | Fed. Rep. of Germany . |
| 2327191 | 5/1977 | France . |

*Primary Examiner*—Donald P. Walsh
*Assistant Examiner*—Daniel Jenkins
*Attorney, Agent, or Firm*—Krass & Young

[57] ABSTRACT

An ozone generator (10) has top and bottom chambers (12, 14) interconnected by a vertically extending elongated tubular assembly (16). Assembly (16) has a control electrode (18) within a conductive tube member (20) and separated therefrom by an annular dielectric member (22) which only partly fills the space between items (18, 20). The dielectric member (22) is suspended by an O-ring at its upper end within the top chamber (12) and is free from contact with both the electrode (18) and the tube member (20). Gas flow between the top and bottom chambers (12, 14) is along radially inner and outer annular passageways within the assembly (16) and the top chamber (12) is partitioned into two chambers which respectively communicate with these passageways. The generator (10) may have a plurality of similar assemblies (16) extending in parallel between common top and bottom chambers (12, 14).

7 Claims, 1 Drawing Sheet

U.S. Patent — Sep. 20, 1994 — 5,348,709
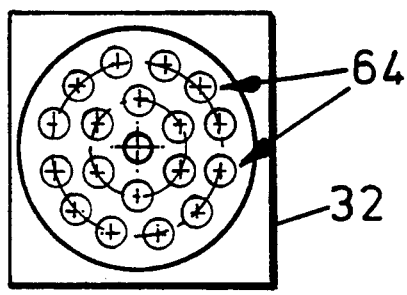
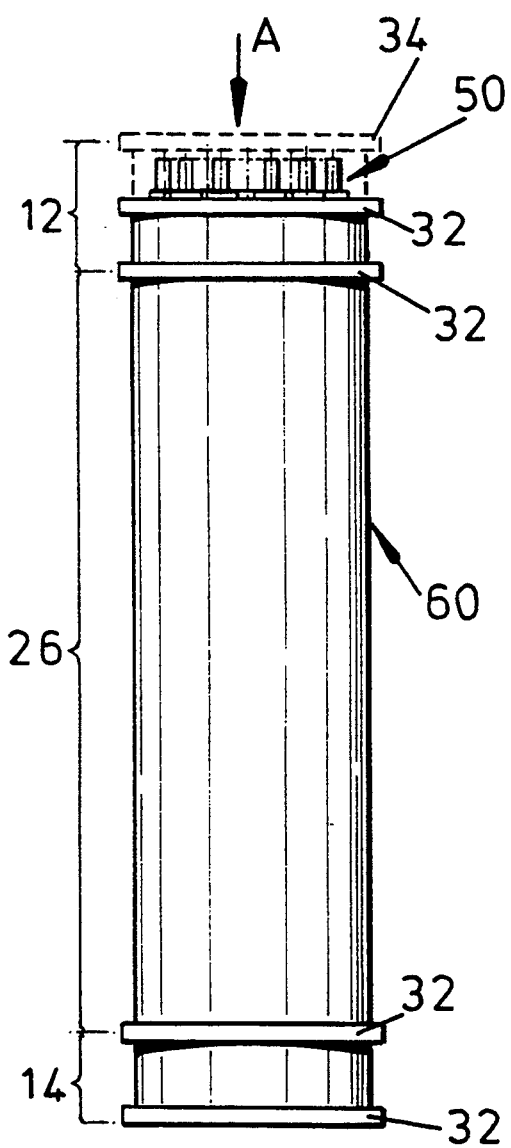
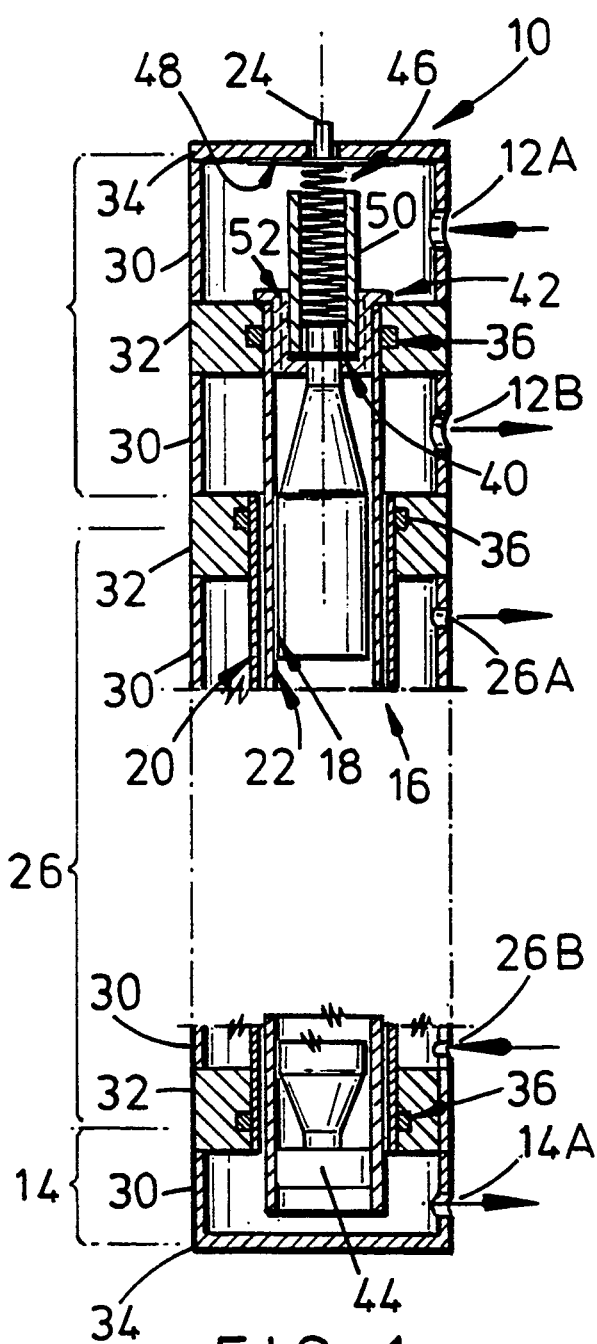

APPARATUS FOR GENERATING OZONE

The present invention relates to apparatus for generating ozone and particularly to such apparatus of the type which includes an elongate tubular assembly which, in use, is generally vertically oriented.

Ozone generators of the tubular type generally have a construction including an elongate annular housing usually made from stainless steel, and an electrode, also of stainless steel, disposed substantially co-axially within the housing, defining an annular space therebetween through which gas containing oxygen ($O_2$) may flow. A glass dielectric tube is normally disposed in part of this annular space and is fastened at both its top and bottom ends in a position where the dielectric tube forms a liner along the entire length of the housing. In use, an a.c. voltage supply is connected to the electrode, (the housing being connected to earth) so that an electric field is generated in the annular space. The electric discharge across the space causes the oxygen ($O_2$) flowing through the space to be converted into ozone ($O_3$).

The dielectric tube is fastened at both its top and bottom ends and therefore is constrained to resist thermal expansion stresses. Furthermore, the a.c. voltage used in the generator causes the dielectric tube to vibrate and because the tube is locked in position, its movement is restricted and this also causes stressing of the tube. Thus the dielectric tube has a limited life. A further problem is that such tubes often need to be removed to be cleaned and the complex structure of some ozone generators makes the removal of such tubes difficult.

It is an object of the present invention to provide a new and improved ozone generator.

According to the present invention there is provided apparatus for generating ozone comprising top and bottom chambers interconnected by an elongate tubular assembly the axis of said assembly being generally vertical, wherein said assembly includes an elongate electrode concentrically located within but spaced apart from an annular-elongate conductive member, a concentric elongate annular dielectric being disposed in and partly filling the space between the electrode and the conductive member so as to define annular passageway means for flow of gas between said top and bottom chambers, said elongate annular dielectric being suspended at its upper end within the top chamber and being dimensioned diametrically so as to be free from contact with both the electrode and the conductive member, whereby said passageway means is formed by radially inner and outer annular passageways.

Preferably said elongate annular dielectric is suspended by an O-ring made of resilient material and which resiliently grips the dielectric, the O-ring resting on a support surface formed within the top chamber. Conveniently said support surface is formed by a support plate which divides the top chamber into upper and lower compartments communicating with said inner and outer annular passageways respectively. Conveniently also said support surface is provided by a shoulder within the thickness of the support plate, the shoulder being surrounded by an axially extending wall dimensioned to centralise the dielectric and its O-ring with respect to the electrode. The support plate may be made of PVC.

Preferably said top chamber includes a releasable cover plate which may be removed to facilitate access to said dielectric.

Preferably also the top and bottom chambers each have a port for inlet/outlet transmission of gas. Conveniently both the upper and lower compartments of said top chamber are provided with a gas transmission port.

Preferably also the part of the assembly which extends between the top and bottom chambers is externally surrounded by means forming a water jacket.

Preferably also the elongate conductive member of the assembly is secured to the lower plate of the top chamber and the upper plate of the bottom chamber. Advantageously said assembly is one of a plurality of similar assemblies each of which connect said top and bottom chambers.

Embodiments of the present invention will now be described by way of example and not by way of limitation with reference to the accompanying drawing, in which:

FIG. 1 is sectional view showing apparatus for generating ozone in accordance with the present invention;

FIG. 2 is an external view of alternative apparatus for generating ozone in accordance with the present invention; and FIG. 3 is a view of the FIG. 2 apparatus taken in the direction of arrow A.

The apparatus 10 shown in FIG. 1 is used in a generally vertical orientation and includes a top chamber 12 having a port 12A for reception of oxygen-containing gases. Top chamber 12 is interconnected via an elongate tubular assembly 16 incorporating a conduit for gas flow, with a bottom chamber 14 having a port 14A for egress of gases. Assembly 16 comprises an electrode 18 concentrically located within but spaced apart from an annular conductive member 20 and a glass dielectric tube 22 is located between items 18,20. In use, member 20 is electrically earthed whereas electrode 18 is connected to an A.C. voltage supply provided at a terminal 24 on the exterior of top chamber 12 so that oxygen gas supplied to port 12A is converted to ozone gas prior to emergence from port 14A. Heat is removed from the assembly 16 by a water jacket 26 formed around the outside of member 20 between the top and bottom chambers 12, 14 and providing a water flow through ports 26A,26B thereof.

In accordance with an important aspect of the present invention dielectric tube 22 is suspended at its upper end within the top chamber 12, extends towards and preferably to or into the bottom chamber 14 and is dimensioned so as to be completely free from contact with both the electrode 18 and the conductive member 20. With this arrangement the tube 22 is free to expand or contract in any direction and therefore is free to withstand thermal expansion stresses and vibration stresses so that it is less easily damaged than hitherto and, as will be further explained, is relatively easily replaced. Furthermore, because tube 22 is spaced from both the electrode 18 and the conductive member 20 the gas flow conduit through the assembly 16 is formed by two separate annular passageways so that the apparatus 10 can be used in a double-pass mode (as will be explained) which enhances the extent of oxygen to ozone conversion.

Chambers 12,14 and jacket 26 are formed by a series of axially aligned tube members 30 between which are disc or plate members 32 and the assembly of members 30,32 is closed by top and bottom closure members 34.

The assembly of members 30,32,34 is held together for example by a series of tie rods (not shown) extending co-axially of the tube members 30 and secured with nuts (not shown) externally of the closure members 34. Each disc member 32 is provided with a centralised aperture containing an annular groove within the thickness of the member 32 for accommodating a resilient O-ring 36. The disc members 32 which define the top and bottom of the water jacket 26 secure the conductive member 20 in place by virtue of the O-rings 36 which of course provide a water seal for the jacket 26. The dielectric tube 22 is suspended from its top end by the O-ring 36 fitted to the uppermost disc member 32 and the dimensions of the components is such that tube 22 is free from contact with the conductive member 20.

Uppermost disc member 22 also acts as a carrier for the electrode 18 which itself is tubular having a larger diameter in its central region than at either of its end regions. Thus, the comparatively small diameter top region of electrode 18 which is located within top chamber 12 is gripped externally by a spring circlip 40 which in turn is supported by a flanged cup 42 the flange of which rests on the upper surface of uppermost disc member 32. The electrode 18 is therefore also effectively suspended at its top end and is prevented from contact with the dielectric tube 22 by the provision of a centralising bobbin 44 fitted to the lowermost end region of the electrode 18 within the dielectric tube 22.

The uppermost end of electrode 18 terminates within the thickness of the uppermost disc member 32 and electrical connection is made to the terminal 24 by means of a helical spring 46 which abuts the electrode 18 and a metal distributor plate 48 on the underside of the top closure member 34 and secured to the terminal 24. Spring 46 is held in position by a sleeve 50 fitted to cup 42. It will be appreciated, of course, that items 24,48,46,18 and 20 are all made of electrically conductive materials such as stainless steel whilst dielectric tube 22 is preferably made of a suitable glass, and the remaining components may be made of non-electrically conductive materials. For example items 34,32,30,42,44,50 are preferably made of PVC but some could be made of stainless steel. The resilient O-rings 36 are preferably made of rubber or a synthetic material.

Cup 42 is provided with at least two, preferably more, axially extending slots or bores 52 to enable metered flow of gas from port 12A into the annular space between electrode 18 and tube 22 and likewise bobbin 44 is either sufficiently under dimensioned diametrically or has axially extending slots to enable flow of gas from that space to port 14A. However, because there is also an annularty extending space between tube 22 and conductive member 20, port 14A may be closed to enable gas flow back up that space to the lower part of top chamber 12 between the uppermost disc member 32 and the central disc member 32 to exit from the apparatus 10 via a further port 12B, thereby providing the double-pass mode of operation.

The conductive member 20 may either be connected directly to electrical earth (which enables the assembly 16 to be air cooled rather than water cooled) or indirectly via the water flow through ports 26A,26B whilst the terminal 24 is connected to the other side of the AC supply which is in the range 3 KV to 20 KV at a frequency in the range 50 Hz to 7 KHz. The electric field thereby established between electrode 18 and member 20 itself tends to centralise the position of the dielectric tube 22.

Dielectric tube 22 is removable from the apparatus 10 simply by removal of the AC supply from terminal 24, release of the tie rod secural nuts abutting top closure member 34, removal of top closure member 34, subsequent removal of electrode 18 with items 46,50 and 42 and thereafter withdrawal of tube 22.

The apparatus 10 which has been described with reference to FIG. 1 has only a single electrode 18 but as is illustrated in FIGS. 2 and 3 the alternative apparatus 60 comprises nineteen electrodes 18 (and tubular assemblies 16) extending in parallel within a single outer casing so that the top and bottom chambers 12,14 are common to the numerous assemblies 16. This is achieved by providing each disc member 32 with nineteen apertures 64. In FIG. 2 the top closure member 34 is shown in phantom as is the uppermost tube member 30 and in this arrangement the distributor plate 48 abuts in common the nineteen springs 46 so that only a single AC terminal 24 is required. It will be appreciated that the apparatus 60 may be dimensionally modified to accommodate any suitable number of assemblies 16.

I claim:

1. Apparatus for generating ozone comprising top and bottom chambers interconnected by an elongate tubular assembly the axis of said assembly being generally vertical, wherein said assembly includes an elongate electrode concentrically located within but spaced apart from an annular elongate conductive member, a concentric elongate annular dielectric being disposed in and partly filling the space between the electrode and the conductive member so as to define annular passageway means for flow of gas between said top and bottom chambers, said elongate annular dielectric being mounted only by being suspended on a resilient member at its upper end within the top chamber whereby the electric field established, in use, between the electrode and the conductive member tends to center the dielectric, the dielectric being dimensioned diametrically so that when centered it is free from contact with both the electrode and the conductive member, whereby the dielectric is free to expand and contract under thermal and vibration stresses and is relatively easily replaced, and said passageway means is formed by radially inner and outer annular passageways respectively formed between the electrode and the dielectric and between the dielectric and the conductive member.

2. Apparatus as claimed in claim 1, wherein said resilient member is and O-ring (36) and which resiliently grips the dielectric (22), the O-ring (36) resting on a support surface formed within the top chamber (12).

3. Apparatus as claimed in claim 2, wherein said support surface is formed by a support plate (32) which divides the top chamber (12) into upper and lower compartments communicating with said inner and outer annular passageways respectively.

4. Apparatus as claimed in claim 3, wherein the upper and lower compartments of said top chamber (12) are respectively provided with gas transmission ports (12A, 12B).

5. Apparatus as claimed in claim 1, wherein said top chamber (12) includes a releasable cover plate (34) which may be removed to facilitate access to said dielectric (22).

6. Apparatus as claimed in claim 1, wherein said assembly (16) is one of a plurality of similar assemblies each of which connect said top and bottom chambers (12, 14).

7. Apparatus as claimed in claim 1, wherein the assembly (16) further comprises a part which extends between the top and bottom chambers (12, 14) and which is externally surrounded by means forming a water jacket (26).

* * * * *